G. M. HUSTON.
VEHICLE SPRING.
APPLICATION FILED OCT. 24, 1913.
Reissued Jan. 20, 1914. 13,677.
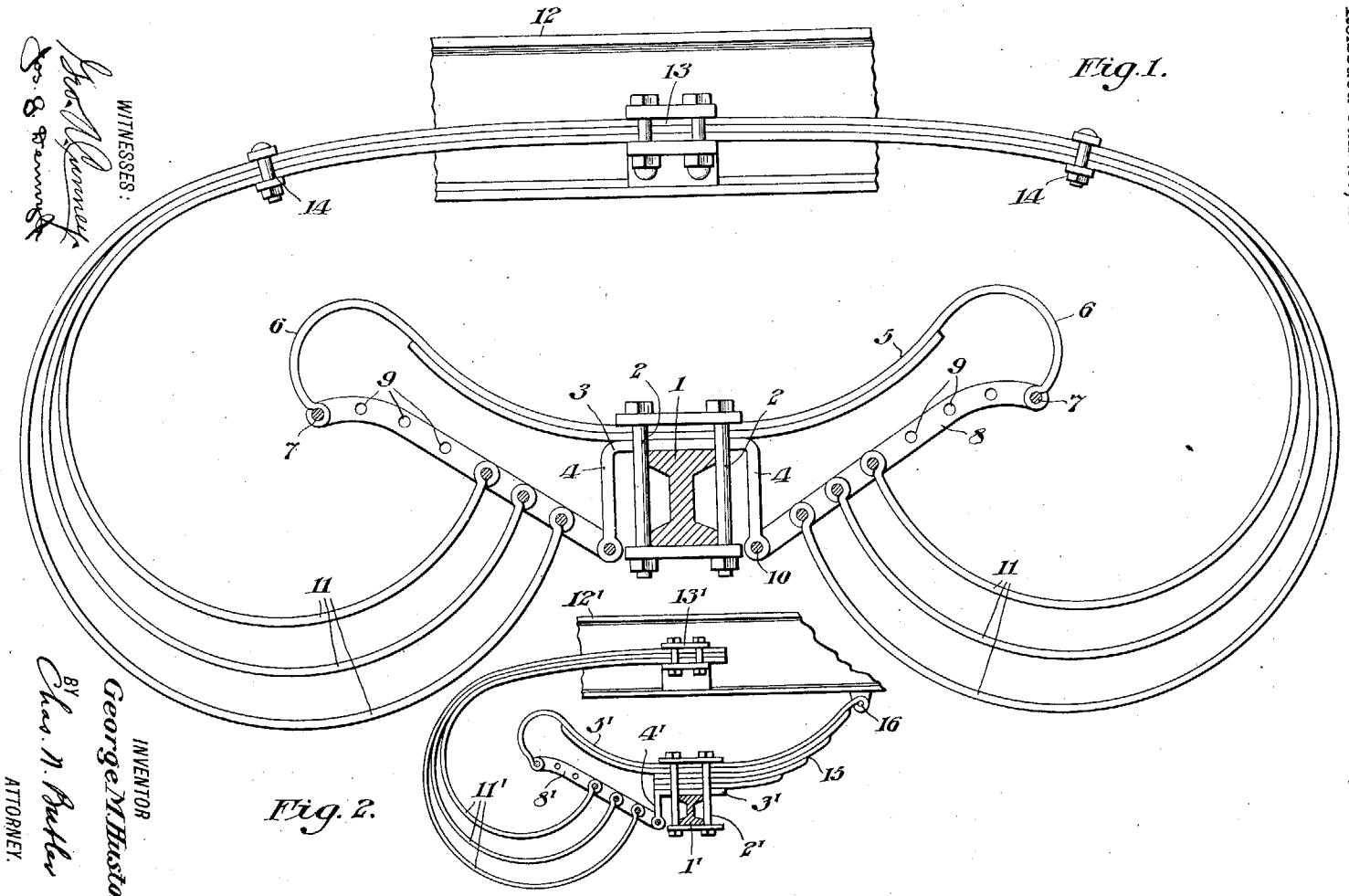
WITNESSES:
Geo. A. Gunney
Jos. S. Dennigh
INVENTOR
George M. Huston,
BY
Chas. N. Butler
ATTORNEY.
COLUMBIA PLANOGRAPH CO., WASHINGTON, D. C.

UNITED STATES PATENT OFFICE.

GEORGE M. HUSTON, OF NEW YORK, N. Y., ASSIGNOR TO HUSTON MULTIPLE C SPRING COMPANY, A CORPORATION OF DELAWARE.

VEHICLE-SPRING.

13,677. Specification of Reissued Letters Patent. Reissued Jan. 20, 1914.

Original No. 1,032,214, dated July 9, 1912, Serial No. 688,326. Application for reissue filed October 24, 1913. Serial No. 797,124.

*To all whom it may concern:*

Be it known that I, GEORGE M. HUSTON, a citizen of the United States, residing at New York, in the borough of Manhattan and State of New York, have invented new and useful Improvements in Vehicle-Springs, of which the following is a specification.

My invention relates to vehicle springs, and is more particularly intended for use with motor vehicles, and has for its object to provide certain improvements in the construction and arrangement of the same, as will be hereinafter more particularly pointed out and claimed, reference being had to the accompanying drawings, in which:

Figure 1 is a side elevation of my improved construction shown applied to a vehicle axle and body, said axle being shown in section. Fig. 2 is a similar view on a smaller scale illustrating a modified construction.

In the said drawing the reference numeral 1 denotes one of the axles of an automobile or other vehicle, the same being shown I-shaped in cross section, though it may be of any configuration. Bolted to said axle at 2 is a plate 3, the same having formed integral therewith an arm 4 depending on each side of said axle, as shown. Bolted or otherwise fixed to said plate 3 is a leaf spring 5, formed of any desired number of leaves, and projecting equidistant transversely to each side of the axle 1, said spring being moved downwardly and inwardly at its outer ends 6, for a purpose hereinafter to be described. Pivotally connected at 7 to each free end of said spring 5 is a rigid bar or shackle 8 preferably slightly curved downwardly at its outer end and provided along its length with plurality of bolt receiving apertures 9, said bar being shown pivotally connected at its inner end at 10 with the lower end of one of the arms 4 of plate 3. Pivotally connected to said shackle 8, through the bolt holes or apertures 9, are the ends of a series of spring leaves 11, the same sweeping therefrom upwardly in the arcs of circles and being conjointly connected to the body 12 of the vehicle at a point 13 directly above the axle 1, said leaves extending in similar configuration downwardly again to the shackle 8 on the opposite side of axle 1. I prefer to graduate the thickness of said leaves 11, the outermost being thickest and the innermost the thinnest.

In operation, any shock imparted to the axle 1 from the wheels of the vehicle will cause a relative movement of the outer ends of leaf spring 5 downwardly with respect to said axle, and a corresponding downward movement of the outer ends of shackles 8 on their pivots 10, the curved configuration at 6 of said leaf springs freely permitting this movement. In consequence, the lower ends of springs 11 are carried downward in varying degree according to the distances of their points of attachment to shackles 8 from the pivots 10, the lighter inner leaf being carried farther than the outer heavier leaves. This results in a progressively increased area of contact between the faces of said springs from their common point of connection 13 with the vehicle body toward their separated points of connection with the shackles 8, which will vary in accordance with the shock imparted to axle 1, and as said area of contact increases, the rigidity of said leaves increases correspondingly to afford a progressive increase in the resistance offered to the shock, until the latter is completely absorbed.

It will be seen from the drawing that beginning at substantially the points where the clips 14 are located the leaves 11 are formed on the arcs of true circles of varying diameters, which construction permits of their accurately registering in progressive contact with each other while absorbing shocks imparted to the axle 1. To accommodate lighter loads, I shift the point of connection of each leaf 11 outward one or more of the holes 9 in shackles 8, which adjustment throws more pressure on the leaf springs 5 and causes the vehicle body to ride easier. In order to maintain the relative position of the leaves 11, I preferably arrange on them suitable clips 14, as shown.

It will be understood that while I have shown the leaves 11 extended to opposite sides of the axle 1, my improved construction is equally as effective and will operate in the same manner when said leaves are disposed on one side only of said axle and terminate at the point 13 on the vehicle body, the shackle 8 and that portion of leaf spring 5 upon the opposite side of axle 1 being of course also dispensed with. While I have shown three leaves 11, it will be understood that I may employ two, four or more, in accordance with the load to be supported.

In Fig. 2 I have illustrated a modified construction in which my improved device is applied in connection with a semi-elliptic spring 15 pivoted to the vehicle body at 16 which is as to its upper leaves extended into a spring 5′ similar to one end of spring 5 of Fig. 1, the leaves 11′ and shackle 8′ being identical in construction and operation with that of one half of the Fig. 1 construction. This embodiment I employ on the front axles of automobiles and other vehicles to better take up the longitudinal strains.

The foregoing spring constructions provide an unusual degree of resiliency, secure an extended movement of the body with a gradual absorption of shocks otherwise communicated thereto and reduce to a minimum the tendency to breakage or other injury due to shocks, the foregoing functions being due primarily to the size or large radius of curvature, the large arc or extent of curvature, the separation and relative radial movement of the curved sections, and the equalization of action and connections of the spring leaves, which preferably extend outwardly and downwardly from an upper support and thence inwardly and upwardly to their connections with the lower support.

Having described my invention, I claim:

1. A spring construction for vehicles, embodying a plurality of similarly curved spring leaves fixed to one member in contact with each other and gradually separating toward their points of connection with the other member, a shackle pivoted at one end to said other member and to which the separated ends of said leaves are connected intermediate its length, and a spring also fixed to said other member and resiliently supporting the free end of said shackle.

2. In a spring construction for vehicles, a body to be supported, a plurality of similarly curved spring leaves fixed thereto in contact with each other, and gradually separating as they leave said body, a running gear, a shackle pivoted at one end to said running gear and to which said leaves are separately pivoted at their separated ends, and a spring also mounted on said running gear and resiliently supporting the free end of said shackle to permit movement thereof on its pivot under relative movement of the parts, whereby said body spring leaves will be shifted by the movement of said shackle progressively from the outermost to the innermost leaf to cause them to increase their area of contact lengthwise with each other.

3. A spring construction for vehicles, embodying a plurality of nested spring leaves disposed in contact with each other at one end and gradually separating toward their other ends, said leaves being curved on the arcs of true circles from their point of contact with each other to their separated ends.

4. A spring construction for vehicles embodying a plurality of nested spring leaves curved on the arcs of true circles but of different diameters and disposed in contact with each other at one end and fixed to one member of the vehicle and gradually separating toward their other ends, a shackle pivoted at one end to the other member and to which the separated ends of said leaves are connected intermediate of its length, and a spring also fixed to said other member and resiliently supporting the free end of said shackle.

5. A spring construction for vehicles comprising a plurality of curved spring leaves having separated sections one of which is movable to and from another, a leaf spring having a free end within the arc described by leaves aforesaid, and equalizing means connecting corresponding ends of leaves aforesaid with said leaf spring.

6. A spring construction for vehicles, comprising a plurality of curved spring leaves having separated sections one of which is movable to and from another, supporting means to which said leaves are fixed, and supporting means connected with the otherwise free ends of said springs, said second named supporting means comprising an equalizer connecting said free ends.

7. A spring construction for vehicles, comprising the combination, with a body member and a running gear member, of a plurality of spring leaves fixed to said body member, said leaves extending outwardly, downwardly and inwardly and having separated sections such that one can move radially relatively to another, a leaf spring connected with said running gear member and means connected with and depending from said leaf spring, corresponding ends of said spring leaves being connected with and supported by said means.

In testimony whereof I have hereunto set my name this 22d day of October, 1913, in the presence of the subscribing witnesses.

GEORGE M. HUSTON.

Witnesses:

J. H. McNeal,

Charles H. Edmunds.

Copies of this patent may be obtained for five cents each, by addressing the "Commissioner of Patents, Washington, D. C."